United States Patent
Hu et al.

(10) Patent No.: US 11,899,565 B2
(45) Date of Patent: Feb. 13, 2024

(54) SECURE REMOTE TESTING OF HOUSEHOLD APPLIANCES

(71) Applicant: Haier US Appliance Solutions, Inc., Wilmington, DE (US)

(72) Inventors: Haitian Hu, Louisville, KY (US); John Ouseph, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 221 days.

(21) Appl. No.: 17/495,246

(22) Filed: Oct. 6, 2021

(65) Prior Publication Data
US 2023/0107229 A1 Apr. 6, 2023

(51) Int. Cl.
| | | |
|---|---|---|
| *G06F 11/00* | (2006.01) | |
| *G06F 11/36* | (2006.01) | |
| *G06F 21/31* | (2013.01) | |
| *D06F 34/14* | (2020.01) | |
| *D06F 34/04* | (2020.01) | |
| *D06F 23/02* | (2006.01) | |

(52) U.S. Cl.
CPC .......... *G06F 11/3664* (2013.01); *D06F 34/04* (2020.02); *D06F 34/14* (2020.02); *G06F 21/31* (2013.01); *D06F 23/025* (2013.01)

(58) Field of Classification Search
CPC ...... G06F 11/3664; G06F 21/31; D06F 34/04; D06F 34/14
See application file for complete search history.

(56) References Cited

U.S. PATENT DOCUMENTS

| | | | |
|---|---|---|---|
| 10,386,802 B2 | 8/2019 | Park | |
| 10,791,001 B2* | 9/2020 | Brian | ................. H04L 12/4625 |
| 2004/0128651 A1* | 7/2004 | Lau | ..................... G06F 11/3664 |
| | | | 717/124 |
| 2004/0164874 A1* | 8/2004 | Tsai | ....................... G08C 19/28 |
| | | | 340/13.31 |
| 2005/0040967 A1* | 2/2005 | Taag | ..................... G08C 19/28 |
| | | | 340/4.61 |

(Continued)

OTHER PUBLICATIONS

Harry Pope, Keeping your Protection One Smart Home Safe from Hackers, https://ba98btya122m.blog.fc2.com/blog-entry-83.html, Mar. 15, 2020, 7 pages.

*Primary Examiner* — Loan L. T. Truong
(74) *Attorney, Agent, or Firm* — Dority & Manning, P.A.

(57) ABSTRACT

Household appliances and methods of testing are provided. The household appliance includes a mechanical component and a controller in operative communication with the mechanical component. The controller has a partitioned memory. The partitioned memory includes a testing partition and a control partition. The controller is configured for and/or the method includes authorizing a user of the household appliance and verifying a personality of the a household appliance. Testing software is loaded into the testing partition of the memory of the controller. The testing software is executed from the testing partition, whereby the mechanical component of the household appliance is operated. The method also includes and/or the controller is also configured for exiting remote testing mode after executing the testing software and deleting the testing software from the partitioned memory when exiting the remote testing mode.

18 Claims, 6 Drawing Sheets

(56) References Cited

U.S. PATENT DOCUMENTS

| | | | |
|---|---|---|---|
| 2007/0156882 A1* | 7/2007 | McCoy | G06F 9/542 |
| | | | 709/223 |
| 2008/0125911 A1* | 5/2008 | Ebrom | H04L 12/282 |
| | | | 700/275 |
| 2010/0169713 A1* | 7/2010 | Argue | G05B 23/0248 |
| | | | 714/E11.029 |
| 2012/0173857 A1 | 7/2012 | Kobraei | |
| 2012/0174067 A1* | 7/2012 | Locker | G06F 11/3688 |
| | | | 717/124 |
| 2014/0208306 A1* | 7/2014 | Halder | G06F 8/65 |
| | | | 717/172 |
| 2018/0018680 A1* | 1/2018 | Bs | G06F 11/3664 |
| 2019/0353156 A1 | 11/2019 | Ward | |
| 2022/0222573 A1* | 7/2022 | Fry | G06N 20/00 |

* cited by examiner

SECURE REMOTE TESTING OF HOUSEHOLD APPLIANCES

FIELD OF THE INVENTION

The present subject matter relates generally to household appliances, and more particularly to methods of securely remotely testing a household appliance.

BACKGROUND OF THE INVENTION

Household appliances are utilized generally for a variety of tasks by a variety of users. For example, a household may include such appliances as laundry appliances, e.g., a washer and/or dryer, kitchen appliances, e.g., a refrigerator, a dishwasher, etc., along with room air conditioners and other various appliances.

Some household appliances can also include features for connecting to and communicating wirelessly with a remote database or server, e.g., the cloud. Such household appliances may thereby be remotely operable, where one or more mechanical components of the household appliance, such as a motor, pump, valve, etc., can be activated or manipulated in response to a remote command, such as a command received over the internet and/or from the cloud.

The ability to remotely operate a household appliance provides several benefits, such as permitting the user to change setting on the appliance or schedule operations of the appliance while the user is not physically present at the same location as the household appliance. As another example, when a diagnostic test of the appliance is desired, such testing may be performed remotely at the user's convenience without having to wait for a technician to be available in person and/or may reduce the total amount of time the technician has to spend at the household. However, the ability to remotely operate a household appliance also entails a potential for exploitation by unauthorized parties. For example, it may be possible for an unauthorized user to remotely access a household appliance and cause the appliance to take actions that are undesirable to the owner of the household appliance.

Accordingly, household appliances and methods of testing such appliances which provide remote access with improved security are desirable.

BRIEF DESCRIPTION OF THE INVENTION

Aspects and advantages of the invention will be set forth in part in the following description, or may be obvious from the description, or may be learned through practice of the invention.

In one aspect of the present disclosure, a method of testing a household appliance is provided. The household appliance includes a controller having a partitioned memory. The partitioned memory includes a testing partition and a control partition. The method includes authorizing a user of the household appliance and verifying a personality of the a household appliance. The method also includes loading testing software into the testing partition of the memory of the controller. The method further includes executing the testing software from the testing partition, whereby a mechanical component of the household appliance is operated. The method also includes exiting remote testing mode after executing the testing software and deleting the testing software from the partitioned memory when exiting the remote testing mode.

In another aspect of the present disclosure, a household appliance is provided. The household appliance includes a mechanical component and a controller in operative communication with the mechanical component. The controller has a partitioned memory. The partitioned memory includes a testing partition and a control partition. The controller is configured for authorizing a user of the household appliance and verifying a personality of the a household appliance. The controller is also configured for loading testing software into the testing partition of the memory of the controller. The controller is further configured for executing the testing software from the testing partition, whereby the mechanical component of the household appliance is operated. The controller is also configured for exiting remote testing mode after executing the testing software and deleting the testing software from the partitioned memory when exiting the remote testing mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
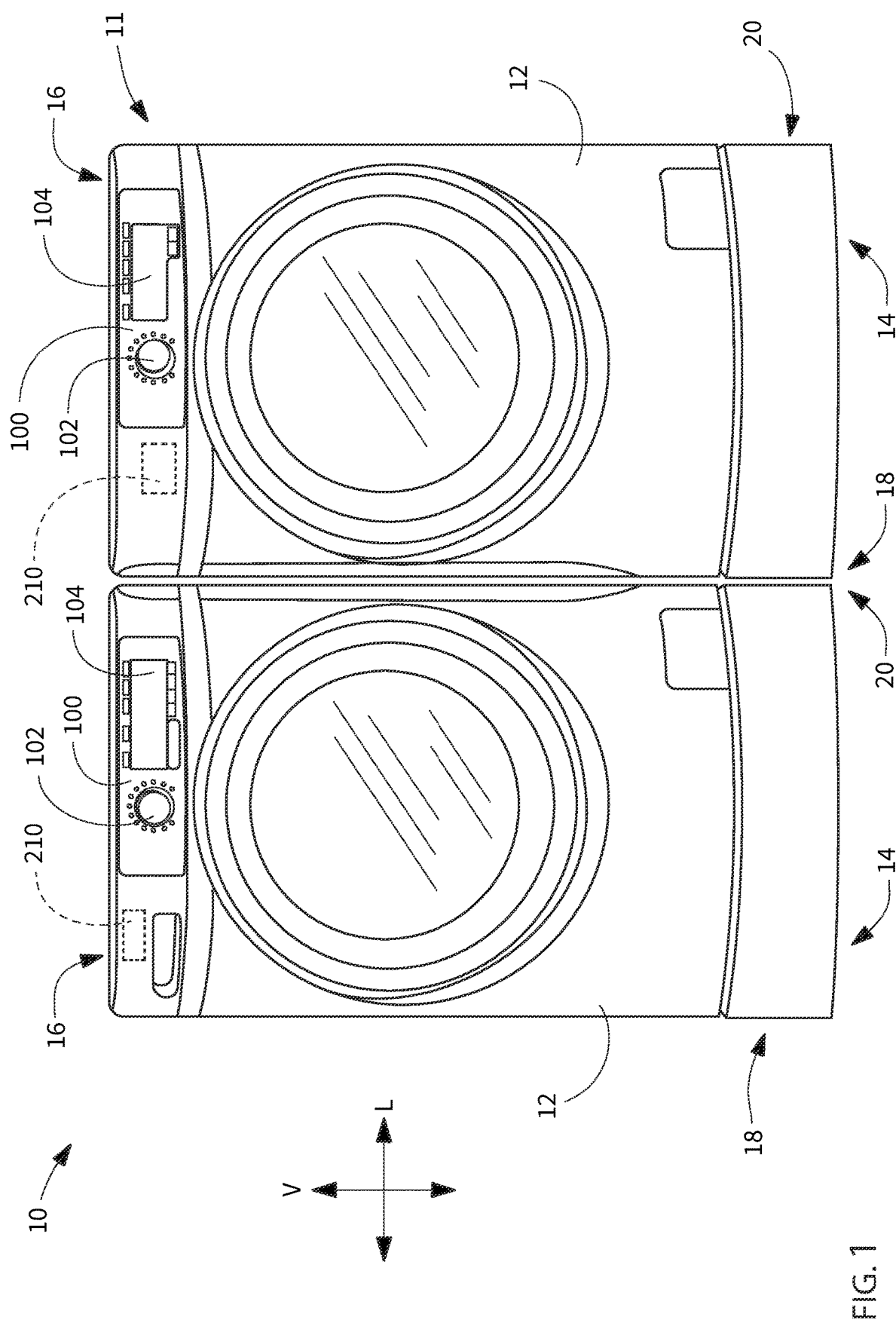
FIG. 1 provides a front view of an exemplary washing machine appliance and an exemplary dryer appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
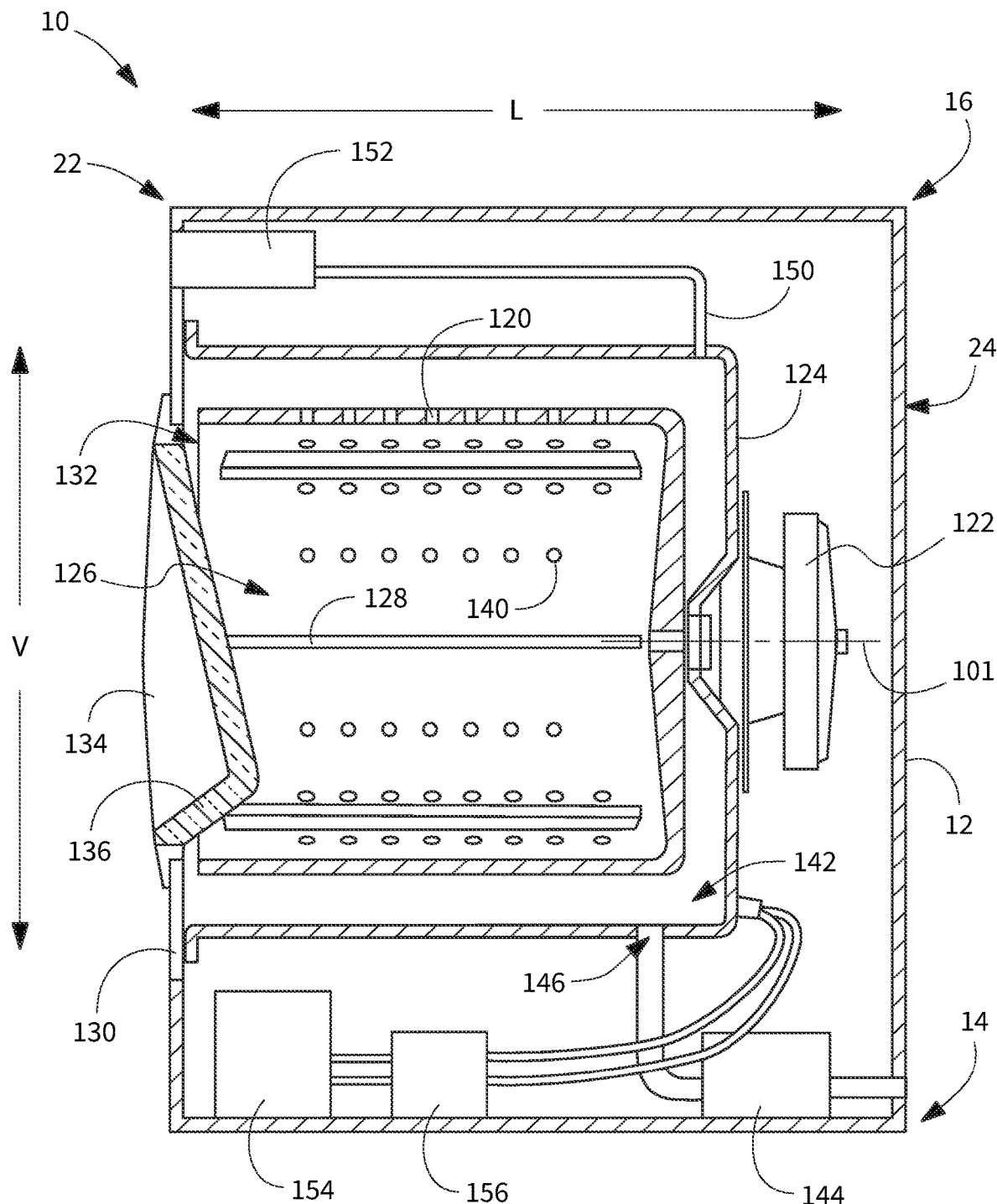
FIG. 2 provides a side cross-sectional view of the exemplary washing machine appliance of FIG. 1.
Figure 3:
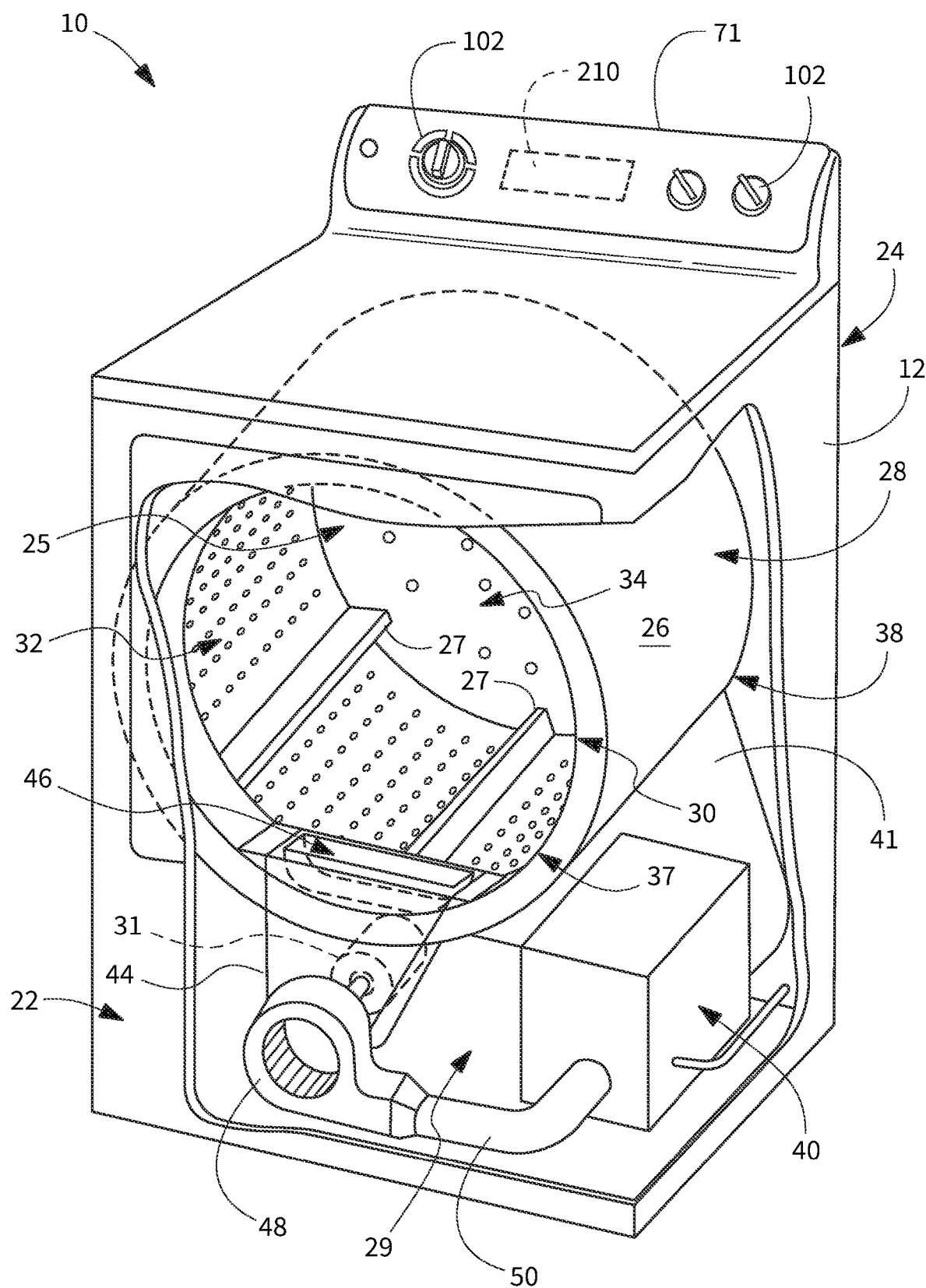
FIG. 3 provides a perspective view of the exemplary dryer appliance of FIG. 1 with portions of a cabinet of the laundry appliance removed to reveal certain components of the dryer appliance.

As may be seen in FIGS. 1 through 3, in accordance with one or more embodiments of the present subject matter, a household appliance may be a washing machine appliance 10 or a dryer appliance 11. The dryer appliance 11 is separately labelled in FIG. 1 to distinguish the dryer appliance 11 from the washing machine appliance 10, where both the washing machine appliance 10 and the dryer appliance 11 are example embodiments of a household appliance 10 which may be usable in one or more exemplary methods described herein and/or may be operable and configured to perform such methods.

As generally seen throughout FIGS. 1 through 4, in at least some embodiments, each appliance 10 includes a cabinet 12 which defines a vertical direction V and a lateral direction L that are mutually perpendicular. Each cabinet 12 extends between a top side 16 and a bottom side 14 along the vertical direction V. Each cabinet 12 also extends between a left side 18 and a right side 20, e.g., along the lateral direction L.

Each household appliance 10 may include a user interface panel 100 and a user input device 102 which may be positioned on an exterior of the cabinet 12. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be the user input device 102.

Generally, each appliance 10 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliance 10. Operation of the appliance 10 may be regulated by the controller 210 that is operatively coupled to the corresponding user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance 10 or 11. Each controller 210 may include a memory and one or more microprocessors, CPUs or the like, such as general or special purpose microprocessors operable to execute programming instructions or micro-control code associated with operation of the appliance 10. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the respective appliance 10 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, the household appliance 10 and 11 may be one (or both) of a pair of laundry appliances. In embodiments such as illustrated in FIG. 1, the user input device 102 of each appliance 10 and 11 may be positioned on the user interface panel 100. The embodiment illustrated in FIG. 1 also includes a display 104 on the user interface panel 100 of each household appliance 10 and 11.

Additional exemplary details of the laundry appliances are illustrated in FIGS. 2 and 3. For example, FIG. 2 provides a cross-sectional view of the exemplary washing machine appliance 10. As illustrated in FIG. 2, a wash tub 124 is non-rotatably mounted within cabinet 12. As may be seen in FIG. 2, the wash tub 124 defines a central axis 101. In the example embodiment illustrated by FIG. 2, the central axis 101 may be oriented generally along or parallel to the transverse direction T of the washing machine appliance 10. Accordingly, the washing machine appliance 10 may be referred to as a horizontal axis washing machine.

Referring again to FIG. 2, a wash basket 120 is rotatably mounted within the tub 124 such that the wash basket 120 is rotatable about an axis of rotation, which generally coincides with central axis 101 of the tub 124. A motor 3, e.g., such as a pancake motor, is in mechanical communication with wash basket 120 to selectively rotate wash basket 120 (e.g., during an agitation or a rinse cycle of washing machine appliance 10). Wash basket 120 defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. The wash basket 120 and the tub 124 may collectively define at least a portion of a tub assembly for the washing machine appliance 10.

Wash basket 120 may define one or more agitator features that extend into wash chamber 126 to assist in agitation and cleaning of articles disposed within wash chamber 126 during operation of washing machine appliance 10. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 12 also includes a front panel 130 which defines an opening 132 that permits user access to wash basket 120 within wash tub 124. More specifically, washing machine appliance 10 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 10. Door 134 also includes a handle (not shown) that, e.g., a user may pull when opening and closing door 134. Further, although door 134 is illustrated as mounted to front panel 130, it should be appreciated that door 134 may be mounted to another side of cabinet 12 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 10. For example, during operation of washing machine appliance 10, wash fluid may be urged by gravity from basket 120 to sump 142 through plurality of perforations 140. A pump assembly 144 is located beneath tub 124 for gravity assisted flow when draining tub 124, e.g., via a drain 146. Pump assembly 144 may be configured for recirculating wash fluid within wash tub 124.

A spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

As illustrated in FIG. 2, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 10. According to the illustrated embodiment, detergent drawer 152 may also be fluidly coupled to spout 150 to facilitate the complete and accurate dispensing of wash additive.

Additionally, a bulk reservoir 154 is disposed within cabinet 12. Bulk reservoir 154 is also configured for receipt of fluid additive for use during operation of washing machine appliance 10. Bulk reservoir 154 is sized such that a volume of fluid additive sufficient for a plurality or multitude of wash cycles of washing machine appliance 10 (e.g., five, ten, twenty, fifty, or any other suitable number of wash cycles) may fill bulk reservoir 154. Thus, for example, a user can fill bulk reservoir 154 with fluid additive and operate washing machine appliance 10 for a plurality of wash cycles without refilling bulk reservoir 154 with fluid additive. A reservoir pump 156 is configured for selective delivery of the fluid additive from bulk reservoir 154 to wash tub 124.

During operation of washing machine appliance 10, laundry items are loaded into wash basket 120 through opening 132, and washing operation is initiated through operator manipulation of input selectors 102. Wash tub 124 is filled with water, detergent, and/or other fluid additives, e.g., via spout 150 and/or detergent drawer 152. One or more valves (not shown) can be controlled by washing machine appliance 10 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a spin cycle, basket 120 is rotated at relatively high speeds. After articles disposed in wash basket 120 are cleaned and/or washed, the user can remove the articles from wash basket 120, e.g., by opening door 134 and reaching into wash basket 120 through opening 132.

While described in the context of a specific embodiment of horizontal axis washing machine appliance 10, using the teachings disclosed herein it will be understood that horizontal axis washing machine appliance 10 is provided by way of example only. It should be appreciated that the present subject matter is not limited to any particular style, model, or configuration of washing machine appliance. Other washing machine appliances having different configurations, different appearances, and/or different features may also be utilized with the present subject matter as well, e.g., vertical axis washing machine appliances.

FIG. 3 provides a perspective view of the dryer appliance of FIG. 1, which is an example embodiment of a household appliance 10, with a portion of a cabinet or housing 12 of dryer appliance 10 removed in order to show certain components of dryer appliance 10. Dryer appliance 10 generally defines a vertical direction V, a lateral direction L, and a transverse direction T, each of which is mutually perpendicular, such that an orthogonal coordinate system is defined. While described in the context of a specific embodiment of dryer appliance 10, using the teachings disclosed herein, it will be understood that dryer appliance 10 is provided by way of example only. Other dryer appliances having different appearances and different features may also be utilized with the present subject matter as well.

Cabinet 12 includes a front side 22 and a rear side 24 spaced apart from each other along the transverse direction T. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

As used herein, the terms "clothing" or "articles" includes but need not be limited to fabrics, textiles, garments, linens, papers, or other items from which the extraction of moisture is desirable. Furthermore, the term "load" or "laundry load"

refers to the combination of clothing that may be washed together in a washing machine or dried together in a dryer appliance 10 (e.g., clothes dryer) and may include a mixture of different or similar articles of clothing of different or similar types and kinds of fabrics, textiles, garments and linens within a particular laundering process.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 10.

The rear wall 34 of drum 26 may be rotatably supported within the cabinet 12 by a suitable fixed bearing. Rear wall 34 can be fixed or can be rotatable. Rear wall 34 may include, for instance, a plurality of holes that receive hot air that has been heated by heating system 40. The heating system 40 may include, e.g., a heat pump, an electric heating element, and/or a gas heating element (e.g., gas burner). Moisture laden, heated air is drawn from drum 26 by an air handler, such as blower fan 48, which generates a negative air pressure within drum 26. The moisture laden heated air passes through a duct 44 enclosing screen filter 46, which traps lint particles. As the air passes from blower fan 48, it enters a duct 50 and then is passed into heating system 40. In some embodiments, the dryer appliance 10 may be a conventional dryer appliance, e.g., the heating system 40 may be or include an electric heating element, e.g., a resistive heating element, or a gas-powered heating element, e.g., a gas burner. In other embodiments, the dryer appliance may be a condensation dryer, such as a heat pump dryer. In such embodiments, heating system 40 may be or include a heat pump including a sealed refrigerant circuit. Heated air (with a lower moisture content than was received from drum 26), exits heating system 40 and returns to drum 26 by duct 41. After the clothing articles have been dried, they are removed from the drum 26 via opening 32. A door (FIG. 1) provides for closing or accessing drum 26 through opening 32.

In some embodiments, one or more selector inputs 102, such as knobs, buttons, touchscreen interfaces, etc., may be provided or mounted on a cabinet 12 (e.g., on a backsplash 71) and are in operable communication (e.g., electrically coupled or coupled through a wireless network band) with the processing device or controller 210. Controller 210 may also be provided in operable communication with components of the dryer appliance 11 including motor 31, blower 48, or heating system 40. In turn, signals generated in controller 210 direct operation of motor 31, blower 48, or heating system 40 in response to the position of inputs 102. As used herein, "processing device" or "controller" may refer to one or more microprocessors, microcontroller, ASICS, or semiconductor devices and is not restricted necessarily to a single element. The controller 210 may be programmed to operate dryer appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller.

Figure 4:
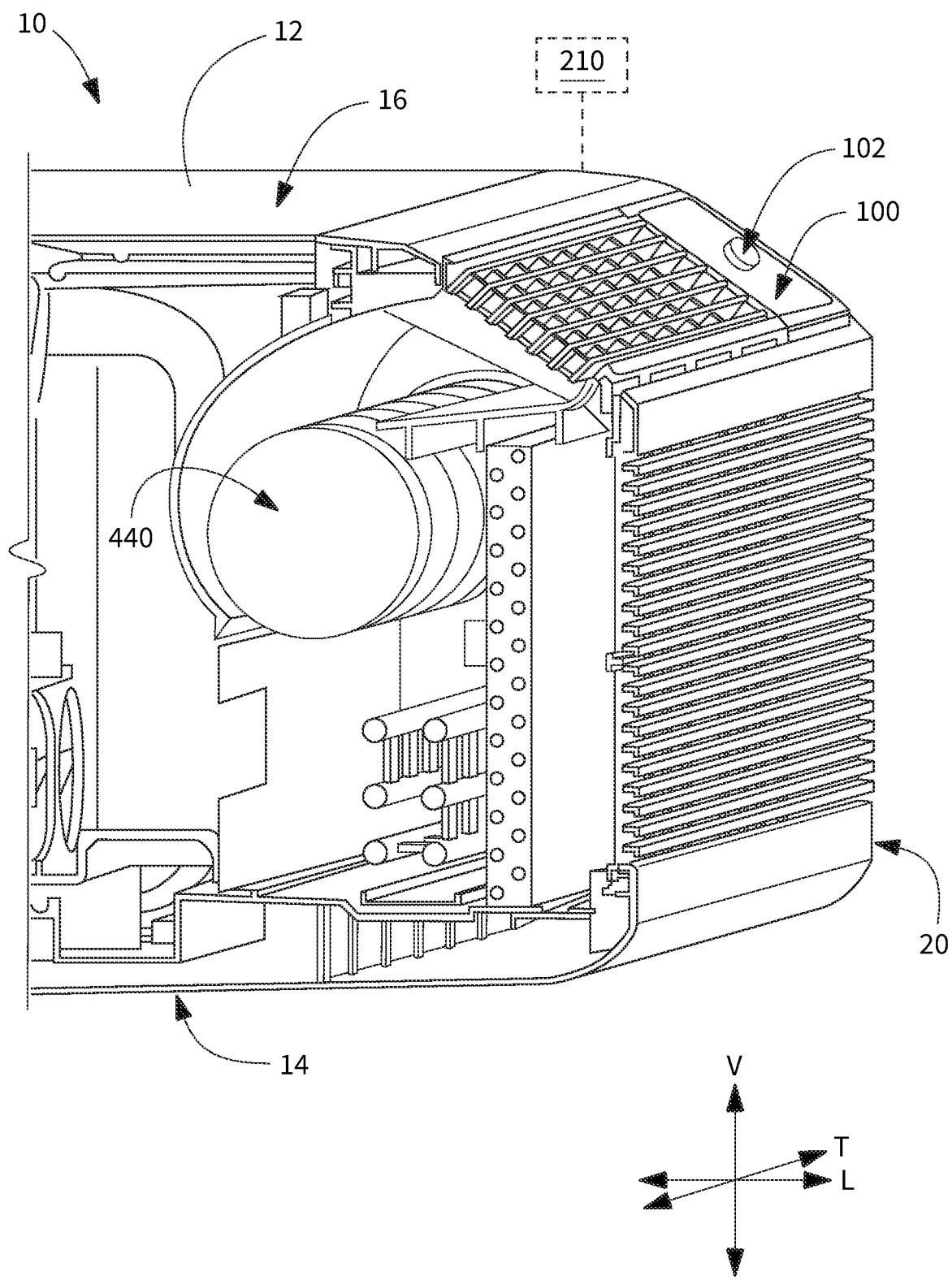
FIG. 4 provides a partial perspective view of an exemplary air conditioner appliance in accordance with additional embodiments of the present disclosure.

In another example embodiment, the appliance 10 may be an air conditioning appliance, e.g., as illustrated in FIG. 4. FIG. 4 illustrates another example embodiment of a household appliance 10, wherein the appliance 10 is a room air conditioner. As illustrated, the exemplary air conditioner 10 includes cabinet 12, user interface panel 100 and user input device 102. In the illustrated example of FIG. 2, the user input device 102 is a control knob. The air conditioner 10 may also include a controller 210, and the controller 210 may be configured to activate a mechanical component of the air conditioner 10, e.g., by turning on fan 440 to circulate air.

According to various embodiments of the present disclosure, the household appliance 10 may take the form of any of the examples described above, or may be any other household appliance. Thus, it will be understood that the present subject matter is not limited to any particular household appliance.

It should be understood that "household appliance" and/or "appliance" are used herein to describe appliances typically used or intended for common domestic tasks, such as a laundry appliance, e.g., as illustrated in FIGS. 1 through 3, or an air conditioner appliance (see, e.g., FIG. 4), a dishwashing appliance, a refrigerator, a water heater, etc., and any other household appliance which performs similar functions in addition to network communication and data processing. Thus, devices such as a personal computer, router, and other similar devices whose primary functions are network communication and/or data processing are not considered household appliances as used herein.

Figure 5:
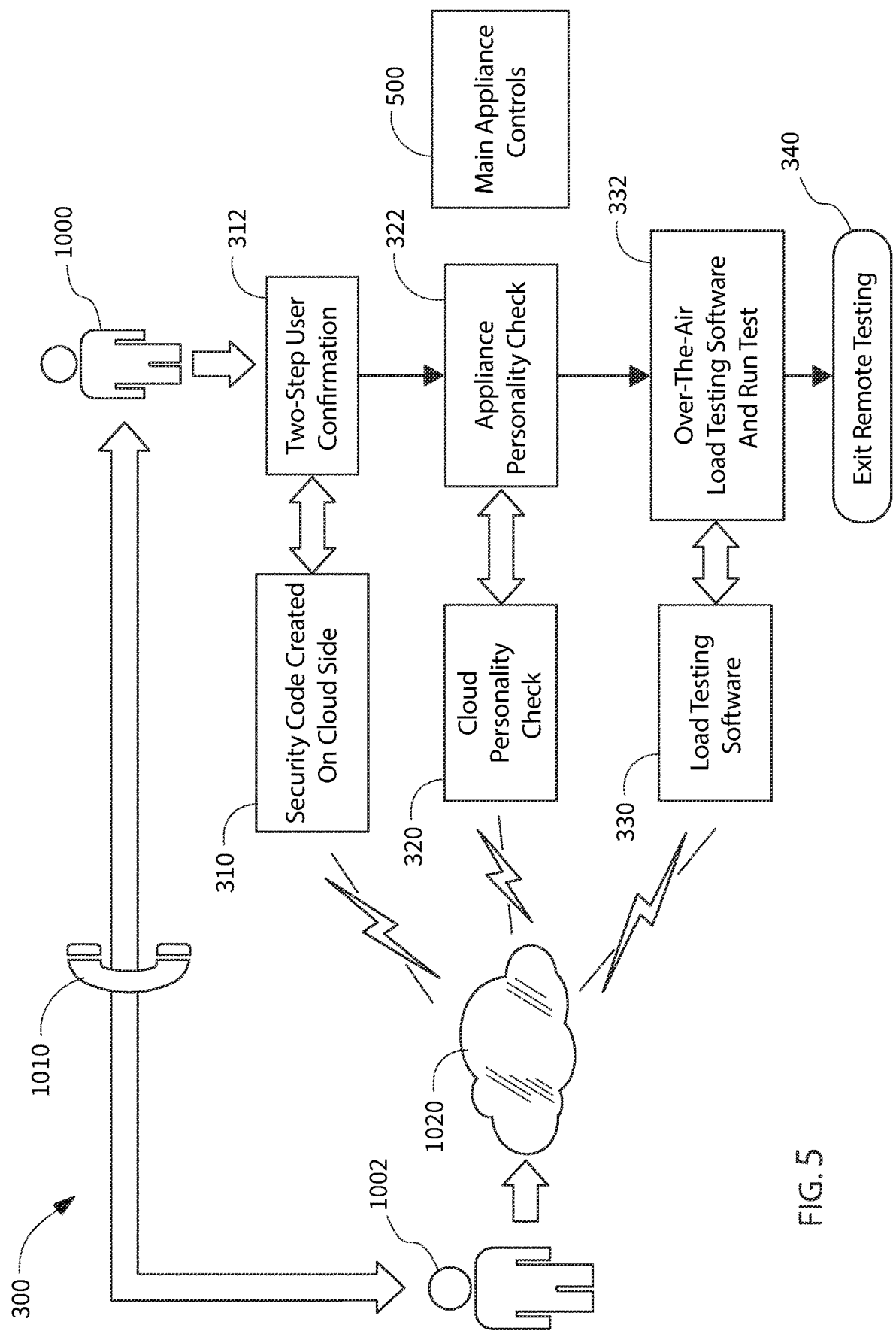
FIG. 5 provides a flow chart illustrating an exemplary method of testing a household appliance in accordance with at least one embodiment of the present subject matter.

FIG. 5 provides a flowchart of an exemplary household appliance test according to one or more embodiments of the present disclosure. As illustrated in FIG. 5, a local user 1000 of the household appliance may be connected to a remote technician 1002 via a phone 1010. The remote technician 1002 may access the household appliance remotely, e.g., via the cloud 1020, and may perform cloud-side operations, e.g., operations 310, 320, and 330, as will be explained in more detail below. The local user 1000 may be physically present at the same location as the household appliance, e.g., in the household, and the local user 1000 may thereby access the household appliance directly, such as by physically touching controls and/or input devices of the household appliance, e.g., pushing buttons, touchpads, and/or touchscreens physically connected to the household appliance. Thus, local operations, e.g., operations 312, 322, and 332, which will be described in more detail below, may be performed by the household appliance in response to direct inputs from the local user 1000.

As may be seen in FIG. 5, the testing software may be modular in design, e.g., each step of the test process may include a cloud-side module and a local module. Also, the testing software may be partitioned from main controls 500 (e.g., partitioned from the main appliance software and partitioned from other partitions of the memory of controller 210 other than a testing partition). Such modularity and partitioning may advantageously provide improved security in that even if an unauthorized user were to gain access to the household appliance remotely, e.g., via the internet, such user would not be thereby able to gain access to controls of the household appliance other than the dedicated testing partition of the controller memory.

As illustrated in FIG. 5, the test may begin with a two-step user confirmation, e.g., as shown at 310 and 312 in FIG. 5. The remote technician may generate a security code on the cloud side, e.g., as shown at 310 in FIG. 5, and the security code may be transmitted to the household appliance, e.g., embedded or encoded in a signal that is relayed to the household appliance via the internet. The remote technician may then communicate the security code to the local user, e.g., over the phone 1010 connection illustrated in FIG. 5. As shown at 312 in FIG. 5, the local user may then enter the code directly into the household appliance to complete the two-step user confirmation. As denoted by the double arrow between 310 and 312 in FIG. 5, the security code entered by the local user must match the security code created by and received from the cloud side in order to complete the user confirmation.

Still referring to FIG. 5, the test may continue by verifying a personality of the household appliance. The personality of the household appliance may include the specific appliance and model, as well as the serial number of the particular individual household appliance to be tested. For example, the personality of the household appliance may also include specifying a type or kind of one or more components of the household appliance, such as a motor of the household appliance and/or other similar components. The component type information may be correlated with the serial number of the household appliance. For instance, different units of the same model household appliance may have different components, such as different motor types, and the motor type (and/or other component type) may be verified as part of the appliance personality verification. As denoted by the double arrow between 320 and 322 in FIG. 5, the appliance personality data on the household appliance, e.g., stored in a local memory of the household appliance, must match the household appliance personality data stored in the cloud side in order to complete the appliance personality verification. For example, the local user may provide the appliance serial number to the remote technician, e.g., by reading the serial number over the phone, and the remote technician may then enter the serial number into the cloud database, whereupon the cloud database returns an appliance personality value (e.g., as shown at 320 in FIG. 5) that is matched against a local appliance personality value (e.g., as shown at 322 in FIG. 5) in order to verify the personality of the household appliance.

As illustrated at 330 in FIG. 5, after confirming the user and verifying the personality of the household appliance, the testing software maybe loaded into the household appliance, e.g., into a testing partition of a memory thereof. The testing software may then be executed over the air by the household appliance, e.g., as illustrated at 332 in FIG. 5. Executing the testing software may include running a test algorithm, and causes at least one mechanical component of the household appliance to be operated. For example, the mechanical component may be a motor, such as the motor 122 of the washing machine appliance or the motor 31 of the dryer appliance, a fan, such as fan 440 of the air conditioning appliance, a pump, a compressor, or valve, among other possible example mechanical components of a household appliance. Also, operating the mechanical component includes changing a physical status of the component, e.g., a speed, position, etc. of the component, such as accelerating the motor, fan, etc., e.g., from a zero starting speed, opening a valve, and/or other changes in the physical state of one or more mechanical components of the household appliance.

After running the test, the household appliance then exits the remote testing mode, e.g., as illustrated at 340 in FIG. 5. For example, exiting the remote testing mode may include disconnecting a remote connection to the household appliance and/or removing (deleting) the testing software from the memory of the controller of the household appliance. Deleting the testing software at the same time as exiting the remote test mode may also advantageously provide additional security for the household appliance. For example, if an unauthorized user were to subsequently gain access to the household appliance remotely, such user would be prevented or limited from operating the appliance remotely when the testing software is not loaded, e.g., has been deleted from the memory. In some embodiments, the remote testing mode may also be exited automatically, e.g., independently of the test being completed. For example, if the connection is interrupted before the test is completed or the test does not complete for some other reason, the remote testing mode may be automatically exited after a timeout period has elapsed. For example, the timeout period may be between about five minutes and about thirty minutes, such as between about ten minutes and about twenty minutes, such as about fifteen minutes.

Figure 6:
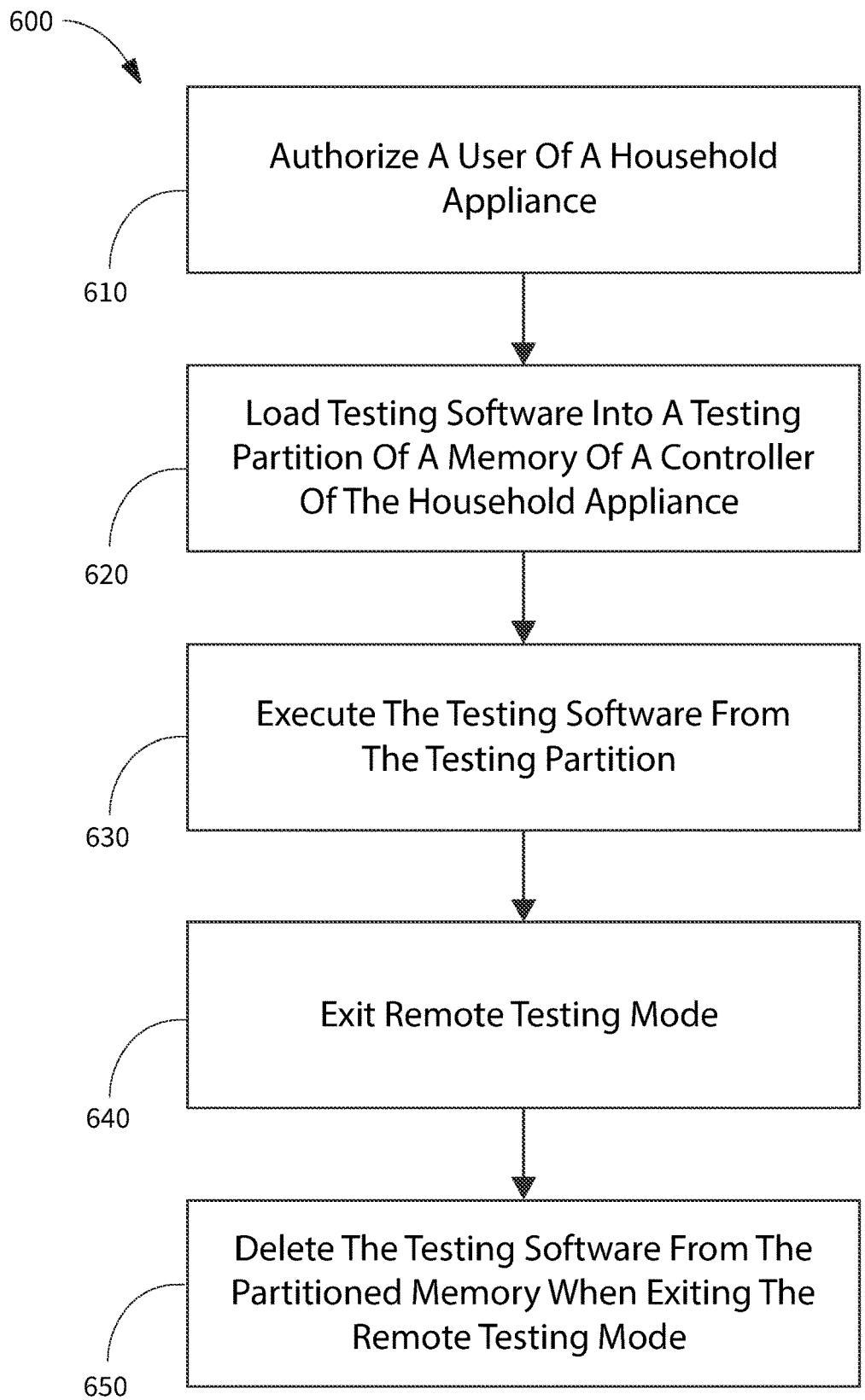
FIG. 6 provides a flow chart illustrating another exemplary method of testing a household appliance in accordance with one or more additional embodiments of the present subject matter.

Turning now to FIG. 6, an example embodiment of a method 600 of testing a household appliance 10 in accordance with the present disclosure is illustrated in a flow chart diagram. The household appliance may include a controller having a partitioned memory. The partitioned memory may include a testing partition and a control partition. Further, in some embodiments, only the testing partition of the memory may be accessible remotely (e.g., by a remote connection) and the remainder of the memory, e.g., the control partition, may be configured to only respond to commands from a local port, e.g., from a user interface and/or an input device thereof that is physically connected to the household appliance.

As illustrated in FIG. 6, the method 600 may include a step 610 of authorizing a user of the household appliance. In some exemplary embodiments, the user authorization may be a two-step user authorization, e.g., as described above with respect to FIG. 5. For example, authorizing the user of the household appliance may include generating a security code, by a remote device, such as a remote database or remote server, e.g., in the cloud. Authorizing the user of the household appliance may further include receiving the security code by the household appliance via a user interface physically connected to the household appliance.

The method 600 may also include a step 620 of verifying a personality of the household appliance. For example, as discussed above regarding FIG. 5, the personality of the household appliance may be based on a serial number of the appliance and may include information such as a motor type or other component type information. Thus, the personality of the appliance may ensure compatibility of the household appliance with the testing software, such as verifying that the mechanical component of the household appliance is compatible with the testing software, e.g., ensuring the proper voltage is supplied to the motor, that the operating speed range coincides with the capabilities of the motor or other mechanical component, etc. Further, the personality of the appliance may also serve as a verification and authentication check, e.g., ensuring that the person or entity attempting to remotely access the household appliance is properly authorized by ensuring that the serial number information and the component type information in the appliance personality match on the local side and the cloud side.

Method 600 may further include a step 630 of loading testing software into the testing partition of the memory of the controller. For example, the testing software may be loaded into the testing partition from a remote device, e.g., the cloud, as mentioned above. Once the testing software is loaded, the method 600 may then proceed to step 640 of executing the testing software from the testing partition. As a result of executing the testing software, the testing software will cause a mechanical component of the household appliance to be operated, such as by the controller, e.g., activating a motor or fan, opening a valve, etc., among other possible examples as described above.

The method 600 further includes a step 650 of exiting remote testing mode after executing the testing software, such as after the test has been completed. Also, when, e.g., at the same time as, the appliance exits the remote testing mode, the testing software is deleted from the partitioned memory of the controller, e.g., as illustrated at 660 in FIG. 6. In some embodiments, the remote testing mode is exited automatically when (as soon as) the test has been completed. In instances where the test may be interrupted, such as due to a lost internet connection and/or phone connection, the step 650 of exiting the remote testing mode (and simultaneously the step 660 of deleting the testing software) may be performed automatically after a timeout period has elapsed. As noted above, the timeout period may be about fifteen minutes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of testing a household appliance, the household appliance comprising a controller having a partitioned memory, the partitioned memory comprising a testing partition and a control partition, the method comprising:
   authorizing a user of the household appliance;
   verifying a personality of the household appliance;
   loading testing software into the testing partition of the memory of the controller;
   executing the testing software from the testing partition, whereby a mechanical component of the household appliance is operated;
   exiting remote testing mode after executing the testing software; and
   deleting the testing software from the partitioned memory when exiting the remote testing mode.

2. The method of claim 1, wherein authorizing the user of the household appliance comprises generating a security code, by a remote device, and receiving the security code by the household appliance via a user interface physically connected to the household appliance.

3. The method of claim 1, wherein verifying the personality of the household appliance comprises verifying a serial number of the household appliance.

4. The method of claim 1, wherein verifying the personality of the household appliance comprises verifying that the household appliance is compatible with the testing software.

5. The method of claim 4, wherein verifying that the household appliance is compatible with the testing software comprises verifying that the mechanical component of the household appliance is compatible with the testing software.

6. The method of claim 1, wherein the step of loading the testing software into the testing partition of the memory of the controller comprises loading the testing software from a remote device into the testing partition of the memory of the controller.

7. The method of claim 1, wherein the testing partition is the only partition of the partitioned memory accessible by a remote connection.

8. The method of claim 1, wherein the control partition of the partitioned memory is configured to only respond to command from a user interface physically connected to the household appliance.

9. The method of claim 1, wherein the step of exiting the remote testing mode is performed automatically after a timeout period has elapsed.

10. A household appliance, comprising:
    a mechanical component; and
    a controller in operative communication with the mechanical component, the controller having a partitioned memory, the partitioned memory comprising a testing partition and a control partition;
    wherein the controller is configured for:
      authorizing a user of the household appliance;
      verifying a personality of the a household appliance;
      loading testing software into the testing partition of the memory of the controller;
      executing the testing software from the testing partition, whereby the mechanical component of the household appliance is operated;
      exiting remote testing mode after executing the testing software; and
      deleting the testing software from the partitioned memory when exiting the remote testing mode.

11. The household appliance of claim 10, wherein the controller is configured for authorizing the user of the household appliance comprises by receiving a security code via a user interface physically connected to the household appliance, wherein the security code is generated by a remote device.

12. The household appliance of claim 10, wherein verifying the personality of the household appliance comprises verifying a serial number of the household appliance.

13. The household appliance of claim 10, wherein verifying the personality of the household appliance comprises verifying that the household appliance is compatible with the testing software.

14. The household appliance of claim 13, wherein verifying that the household appliance is compatible with the testing software comprises verifying that the mechanical component of the household appliance is compatible with the testing software.

15. The household appliance of claim 10, wherein the controller is configured for loading the testing software into the testing partition of the memory of the controller from a remote device.

16. The household appliance of claim 10, wherein the testing partition is the only partition of the partitioned memory accessible by a remote connection.

17. The household appliance of claim 10, wherein the control partition of the partitioned memory is configured to only respond to command from a user interface physically connected to the household appliance.

18. The household appliance of claim 10, wherein the controller is configured for exiting the remote testing mode automatically after a timeout period has elapsed.

* * * * *